(12) United States Patent
Wilson et al.

(10) Patent No.: US 9,053,203 B2
(45) Date of Patent: Jun. 9, 2015

(54) PROVIDER-SPECIFIC PARSING FOR CONTENT RETRIEVAL

(75) Inventors: Mei L. Wilson, Redmond, WA (US);
Daniel Dinu, Redmond, WA (US);
Andrew J. Clinick, Issaquah, WA (US);
Jesse Sage Schreiner, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 12/963,573

(22) Filed: Dec. 8, 2010

(65) Prior Publication Data

US 2012/0150988 A1  Jun. 14, 2012

(51) Int. Cl.
*G06F 15/16* (2006.01)
*G06F 17/30* (2006.01)

(52) U.S. Cl.
CPC ................ *G06F 17/30899* (2013.01)

(58) Field of Classification Search
USPC .................................... 709/217, 203
See application file for complete search history.

(56) References Cited

U.S. PATENT DOCUMENTS

| | | | |
|---|---|---|---|
| 7,469,283 B2 | 12/2008 | Eyal et al. | |
| 7,711,775 B2 | 5/2010 | Tavis et al. | |
| 7,917,815 B2 * | 3/2011 | Rapp et al. | 714/57 |
| 2002/0141449 A1 * | 10/2002 | Johnson | 370/473 |
| 2003/0065739 A1 * | 4/2003 | Shnier | 709/217 |
| 2004/0111727 A1 * | 6/2004 | Schwarzbauer et al. | 719/310 |
| 2006/0248166 A1 * | 11/2006 | Milosevic et al. | 709/219 |
| 2008/0313267 A1 * | 12/2008 | Desai et al. | 709/203 |
| 2009/0043815 A1 | 2/2009 | Lee et al. | |
| 2009/0106350 A1 | 4/2009 | Chen et al. | |
| 2009/0157859 A1 * | 6/2009 | Morris | 709/223 |
| 2009/0158141 A1 * | 6/2009 | Bauchot et al. | 715/239 |
| 2011/0010612 A1 * | 1/2011 | Thorpe et al. | 715/234 |

FOREIGN PATENT DOCUMENTS

| | | |
|---|---|---|
| CN | 101079057 A | 11/2007 |
| CN | 101308505 A | 11/2008 |
| CN | 101310512 A | 11/2008 |
| CN | 101438299 A | 5/2009 |
| CN | 101621862 | 1/2010 |
| CN | 201594261 | 9/2010 |

OTHER PUBLICATIONS

Gessner, Rick., "New Layout: Parsing Engine", Retrieved at << http://www.mozilla.org/newlayout/doc/parser.html >>, May 1, 1998, pp. 5.

(Continued)

*Primary Examiner* — Duyen Doan
(74) *Attorney, Agent, or Firm* — Brian Haslam; Mike Allen; Micky Minhas

(57) ABSTRACT

This document describes techniques for, and apparatuses capable of, provider-specific parsing for content retrieval. In one embodiment, a user's computing device receives code (e.g., an executable script) from a content provider and utilizes a parsing scheme associated with the content provider to parse the code and determine an address that can be used to retrieve an instance of content. The instance of content can then be retrieved using the address and without executing the code. In some embodiments, the parsing scheme is specific to the content provider and can be updated based on a change to the code.

20 Claims, 5 Drawing Sheets

(56) References Cited

OTHER PUBLICATIONS

Vfilby., "Parsing Incomplete or Malformed URLs with Regular Expressions", Retrieved at << http://www.filbar.org/weblog/parsing_incomplete_or_malformed_urls_with_regular_expressions >>, Aug. 18, 2006, pp. 5.

Passant, et al., "sparqlPuSH: Proactive notification of data updates in RDF stores using PubSubHubbub", Retrieved at << http://www.semanticscripting.org/SFSW2010/papers/sfsw2010_submission_6.pdf >>, Proceedings of the 6th Workshop on Scripting and Development for the Semantic Web (SFSW), ESWC, 2010, pp. 1-10.

Soto, et al., "Dynamic Parser Cooperation for Extending a Constrained Object-Based Modeling Language", Retrieved at << http://www.inf.ucv.cl/~rsoto/s-comma/Papers/wlp-reg2007.pdf. >>, 21st Workshop on (Constraint) Logic Programming (WLP), No. 434, 2007, pp. 9.

"Foreign Office Action", CN Application No. 201110430573.4, Jan. 6, 2014, 11 Pages.

"Second Office Action and Search Report Issued in Chinese Patent Application No. 201110430573.4", Mailed Date: Sep. 17, 2014, 14 Pages.

* cited by examiner

PROVIDER-SPECIFIC PARSING FOR CONTENT RETRIEVAL

BACKGROUND

Today's online environment provides users with access to a vast array of content, such as videos, music, images, and movies. While some content may be accessible via a direct uniform resource locator (URL) link to the content, many content providers use some type of computer code to provide access to content. For example, a particular content provider may embed a content identifier or a content address (e.g., a URL for the content) in executable script that can be executed to provide access to the content.

For some devices with reduced processing power and/or memory capabilities (e.g., mobile devices), providing access to content via executable code can cause problems when the devices do not have sufficient capabilities to execute the code to reveal the content. For example, in a scenario where a URL for content is embedded within executable script, a mobile device may not support a scripting platform that is capable of executing the script to reveal the URL and access the content. Thus, in such a scenario, the mobile device may not be able to access the content.

SUMMARY

This document describes techniques for, and apparatuses capable of, provider-specific parsing for content retrieval. In one embodiment, a user's computing device receives code (e.g., an executable script) from a content provider and utilizes a parsing scheme associated with the content provider to parse the code and determine an address that can be used to retrieve an instance of content. The instance of content can then be retrieved using the address and without executing the code. In some embodiments, the parsing scheme is specific to the content provider and can be updated based on a change to the code.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Example Environment

Figure 1:
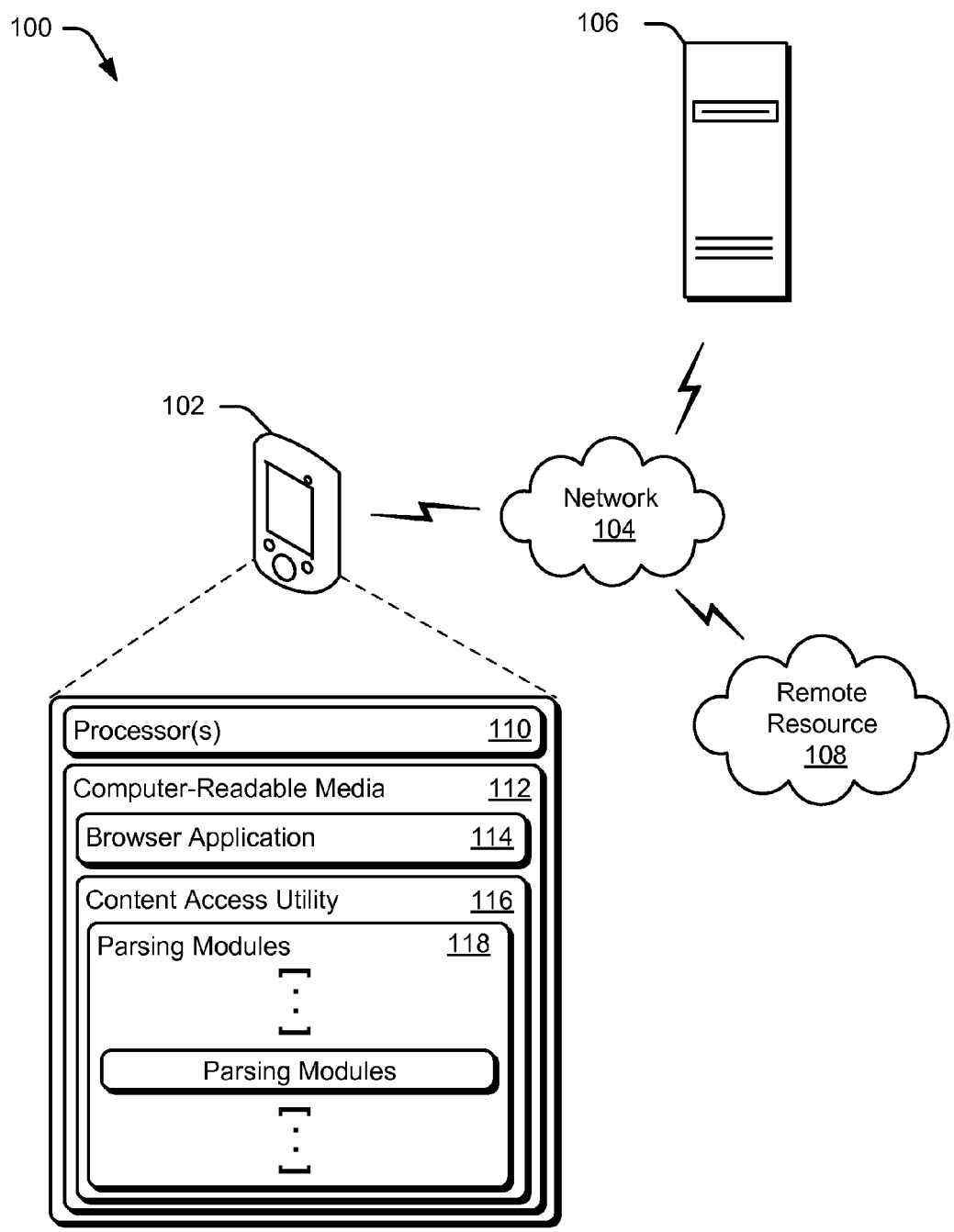
FIG. 1 is an illustration of an environment for provider-specific parsing for content retrieval.

FIG. 1 is an illustration of an environment 100 in which techniques for provider-specific parsing for content retrieval can operate. Environment 100 includes a computing device 102, a network 104, a content manager 106, and a remote resource 108. Computing device 102 is shown as a smart phone for purposes of example only, computing device 102 may be embodied as a variety of different types of devices. Content manager 106 can include a variety of different devices and entities, such as a web server.

As also illustrated in FIG. 1, computing device 102 includes processor(s) 110 and computer-readable media 112. Computer-readable media 112 includes or has access to a browser application 114, a content access utility 116, and parsing modules 118. As illustrated, parsing modules 118 include a variety of different parsing modules. In some embodiments, a specific parsing module of the parsing modules 118 can be specific to a particular content provider, e.g., content manager 106. Also in some embodiments, each parsing module of parsing modules 118 is associated with a different content provider, such as a different network domain. When content manager 106 provides code with an embedded address for an instance of content, a specific parsing module can provide a parsing scheme that can be used to parse the code to reveal the embedded address. A parsing module can include a variety of different information types, such as text, binary-code files, and so on. Thus, in some embodiments a parsing module includes instructions on how to parse code and assemble an address for an instance of content. This can allow computing device 102 to use the address to retrieve the instance of content without requiring computing device 102 to execute the code in which the address is embedded.

Figure 2:
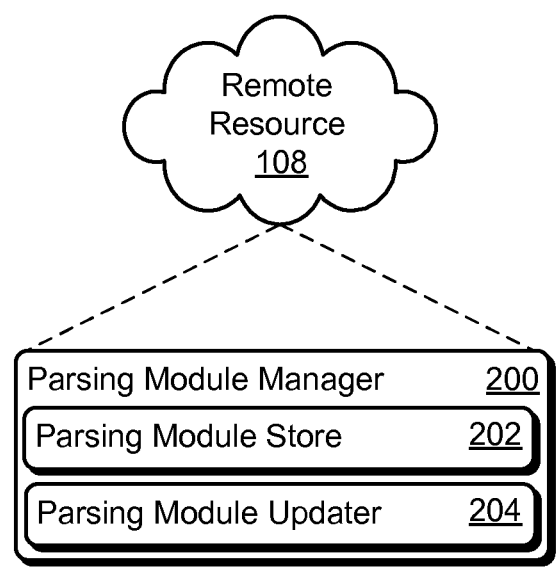
FIG. 2 is an illustration of a remote resource of FIG. 1.

FIG. 2 illustrates a more-detailed embodiment of remote resource 108, including a parsing module manager 200, a parsing module store 202, and a parsing module updater 204. Remote resource 108 can be embodied as a variety of different network-accessible resources. In some embodiments, parsing module store 202 can store parsing modules that are specific to a variety of different content providers. A particular parsing module from parsing module store 202 can be provided to computing device 102 in response to a request from the computing device for the parsing module. Additionally or alternatively, the particular parsing module can be pushed from remote resource 108 to computing device 102. In some embodiments, parsing module updater 204 is operable to update parsing modules that are maintained by parsing module store 202 and/or by parsing modules 118 of computing device 102.

Note that one or more of the entities shown in FIGS. 1 and 2 may be further divided, combined, and so on. Generally, any of the functions described herein can be implemented using software, firmware, hardware (e.g., fixed-logic circuitry), manual processing, or a combination of these implementations. The terms "application," "system," "manager," and "module," as used herein generally represent software, firmware, hardware, whole devices or networks, or a combination thereof. In the case of a software implementation, for instance, these terms may represent program code (e.g., computer-executable instructions) that performs specified tasks when executed on a processor (e.g., CPU or CPUs). The program code can be stored in one or more computer-readable memory devices, such as computer-readable media 112. As utilized herein, computer-readable media can include all forms of volatile and non-volatile memory and/or storage media that are typically associated with a computing device. Such media can include ROM, RAM, flash memory, hard disk, removable media and the like.

Example Processes for Provider-Specific Parsing

The following discussion describes example processes for provider-specific parsing for retrieving content. Aspects of these processes may be implemented in hardware, firmware, software, or a combination thereof. These processes are shown as sets of blocks that specify operations performed, such as through one or more entities of FIGS. 1 and/or 2, and are not necessarily limited to the order shown for performing the operations by the respective blocks. In portions of the following discussion reference may be made to environment 100 of FIG. 1 as well as the detailed embodiment of remote resource 108 illustrated in FIG. 2, though these are not necessarily required.

Figure 3:
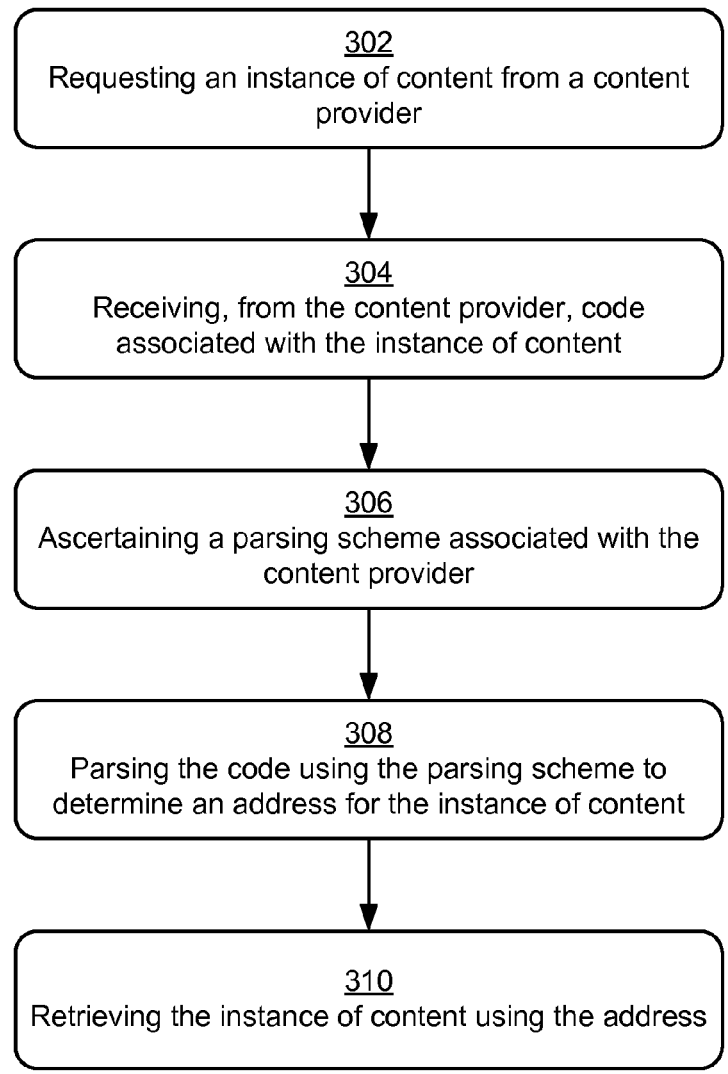
FIG. 3 is a flow diagram depicting an example process for retrieving content using provider-specific parsing.

FIG. 3 is a flow diagram depicting an example process 300 for provider-specific parsing for content retrieval. Block 302 requests an instance of content from a content provider. In the context of environment 100, this request informs content manager 106 that computing device 102 is requesting access to an instance of content hosted by content manager 106. In an example scenario, a user of computing device 102 selects a selectable thumbnail image of a video that is available from content manager 106, such as one displayed via browser application 114 as part of a web page. In response to the selection of the thumbnail image, the request for the instance of content is forwarded (e.g., via network 104) from computing device 102 to content manager 106.

Block 304 receives, from the content provider, code associated with the instance of content. For example, the code can include executable code (e.g., script) that can be executed to reveal an address (e.g., a URL, a uniform resource identifier (URI), and so on) for the instance of content. Other examples of the code include a text-based playlist file, markup code (e.g., HTML), a binary file, and so on. In some embodiments, the code can be a part of a web page associated with content manager 106 that is navigated to via browser application 114. Continuing the ongoing example, mobile device 102 can receive an executable script that includes a URL for the requested instance of content from content manager 106.

Block 306 ascertains a parsing scheme associated with the content provider. In some embodiments, computing device 102 can ascertain the parsing scheme by searching parsing modules 118 and/or by querying parsing module manager 200 for an appropriate parsing module. The parsing scheme can include a variety of different parsing methods, such as text pattern matching, simple regular expression parsing, dumb script parsing, and so on. Example implementations of block 306 are discussed in more detail below in the discussion of FIG. 4.

Block 308 parses the code using the parsing scheme to determine an address for the instance of content. In some embodiments, the address for the content can include a URL or other identifier that can be used to retrieve the content. In an example scenario, block 306 and/or block 308 of example process 300 can be implemented by content access utility 116. In at least some embodiments, the code may be parsed multiple times to determine a single address for the instance of content.

According to some embodiments, parsing code refers to techniques or processes for dividing code into components that can be individually analyzed for content and/or functionality. For example, consider the following simplified example of script code that includes a URL.

```
<html>
    <body>
    The URL for this content is (http://contentaddress)
    </body>
</html>
```

This example script is associated with a particular content provider and can be parsed to extract the URL of "http://contentaddress" from the script. For example, a parsing scheme for the content provider can instruct a parser (e.g., a parser associated with the computing device 102) to locate the language "The URL for this content is" and to extract the URL from within the parenthesis following this language. This scenario is presented for purposes of example only, and a variety of different parsing algorithms and methods may be utilized.

Block 310 retrieves the instance of content using the address. For example, browser application 114 can utilize the URL to navigate to a web resource associated with the requested instance of content (e.g., content manager 106) and retrieve the instance of content. In some embodiments, example process 300 enables a computing device to retrieve an address for an instance of content that is embedded in executable code and retrieve the instance of content without executing the executable code.

Figure 4:
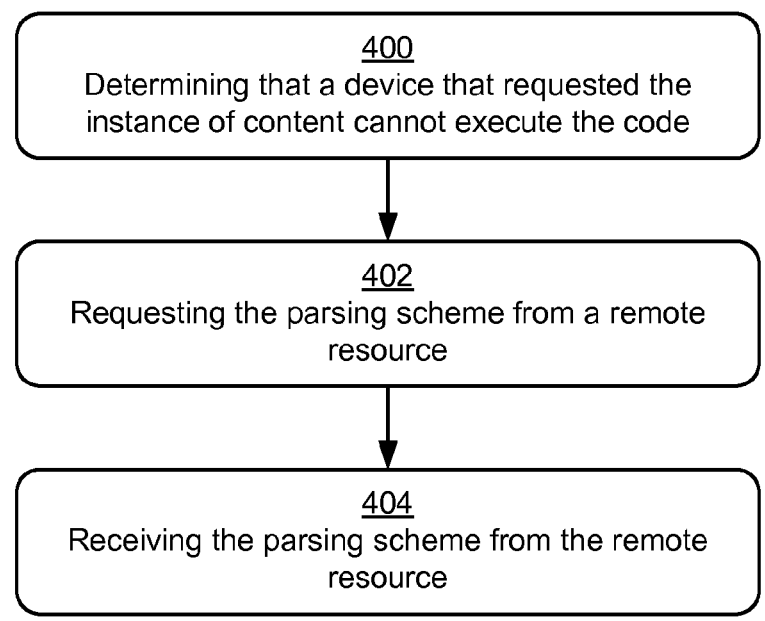
FIG. 4 is a flow diagram depicting an example process for ascertaining a parsing scheme associated with a content provider.

FIG. 4 is a flow diagram depicting an example process for the implementation of block 306 of process 300 illustrated in FIG. 3. Block 400 determines that a device that requested the instance of content cannot execute the code. For example, the code can be associated with a particular scripting platform and the computing device 102 can determine that the scripting platform is not supported by the computing device.

Block 402 requests the parsing scheme from a remote resource. In an example implementation scenario, computing device 102 can request a parsing module associated with content manager 106 from remote resource 108.

Block 404 receives the parsing scheme from the remote resource. For example, in response to the request for the parsing scheme from computing device 102, remote resource 108 can locate the appropriate parsing module (e.g., from parsing module store 202) and forward the appropriate parsing module to computing device 102.

Figure 5:
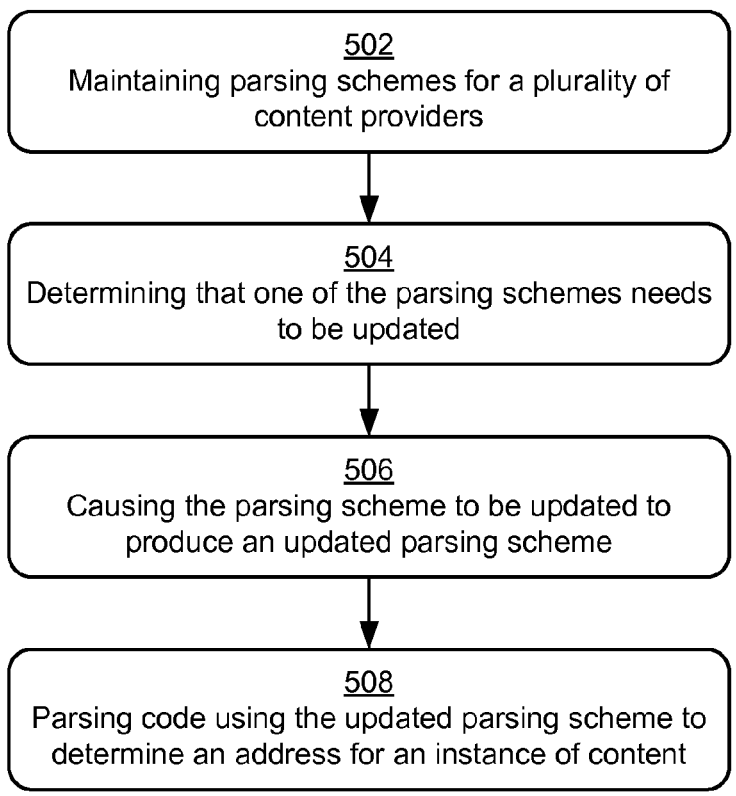
FIG. 5 is a flow diagram depicting an example process for updating a parsing scheme.

FIG. 5 is a flow diagram depicting an example process 500 for updating a parsing scheme. Block 502 maintains parsing schemes for a plurality of content providers. As discussed elsewhere herein, some of the individual parsing schemes can be specific to particular content providers. Block 504 determines that one of the parsing schemes needs to be updated. For example, consider a scenario where computing device 102 attempts to use a particular parsing module to parse code received from content manager 106 but the parsing fails to reveal a usable content address. For example, the parsing may fail to reveal a URL that can be used to access an instance of content. Computing device 102 can then notify parsing module manager 200 that the parsing module failed and that an updated parsing module is needed. In some example embodiments, the content access utility 116 can notify the parsing module manager 200 of a parsing module failure. If the parsing module manager receives notification of a threshold number of parsing module failures, the parsing module manager can cause an updated or new parsing module to be available to the computing device 102 and/or to other devices that can utilize an updated and/or new parsing module.

Additionally or alternatively, parsing module manager 200 may determine that a parsing module associated with a particular content provider needs to be updated. For example, the particular content provider may have updated its website and changed the script associated with the instance of content that is included as part of the website. Other changes that may indicate a need for an update to a parsing scheme include a change to a playlist file that includes the address for the instance of content, a change to HTML that includes the address, and so on.

In some embodiments, parsing module manager 200 can periodically poll content providers to determine if a parsing scheme associated with a content provider needs to be updated. For example, parsing module manager 200 can poll a website that hosts content to determine if changes to the website (e.g., changes to script associated with the website) require that a parsing scheme associated with the website be changed. Alternatively or additionally, a content provider (e.g., content manager 106) can notify parsing module manager 200 and/or computing device 102 that a parsing scheme associated with the content provider needs to be updated.

Block 506 causes the parsing scheme to be updated to produce an updated parsing scheme. Continuing with the previous example and responsive to the failure of the parsing scheme to reveal a usable content address, computing device 102 may request an updated parsing scheme from parsing module manager 200. Parsing module manager 200 can then forward an updated parsing module or an update to an existing parsing module to computing device 102. Additionally or alternatively, parsing module manager 200 can push the updated parsing module or the update to an existing parsing module to computing device 102 responsive to the determination (e.g., by the parsing module manager 200) that the parsing scheme needs updated.

In an example implementation, parsing module manager 200 can maintain a list of devices that have requested and/or received a parsing module for a particular content provider. When the parsing module needs to be updated, parsing module manager 200 can push an updated version of the parsing module to the devices on the list. Alternatively, the parsing module manager can push an update that can be installed on an existing parsing module to the devices on the list.

Block 508 parses code using the updated parsing scheme to determine an address for an instance of content. Examples of code parsing are discussed in more detail above.

While embodiments herein are discussed with respect to parsing a script to determine an address for content, this is not intended to be limiting. In some example embodiments, an address for content can be included as part of a binary file. Techniques discussed herein can determine a parsing scheme for the binary file and can parse the binary file to determine an address and/or location for the content. For example, the binary file can be parsed for the address based on specific bit addresses in the binary file and/or known data patterns within the binary file. The content can then be retrieved using the address and/or location determined from parsing the binary file.

CONCLUSION

This document describes techniques and apparatuses for provider-specific parsing for content retrieval. These techniques and apparatuses enable a user to consume content on a device that has limited processing capabilities. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
receiving web content as executable code that is executable to cause an instance of content referenced within the web content to be retrieved from a content provider;
ascertaining a parsing scheme that is specific to the content provider and that is configured for determining addresses for instances of content from executable code of the content provider independent of executing the executable code from which the address is determined, the parsing scheme being ascertained from among a plurality of different parsing schemes that are each associated with a different respective content provider;
parsing the executable code using the parsing scheme to determine an address for the instance of content; and
retrieving the instance of content using the address.

2. The method as recited in claim 1, wherein the executable code comprises one of more of an executable script, a playlist file, or markup code.

3. The method as recited in claim 1, wherein receiving the executable code that is executable to cause the instance of content to be retrieved is responsive to a request from a device for the instance of content and wherein ascertaining the parsing scheme comprises:
determining that the device that requested the instance of content cannot execute the executable code; and
receiving the parsing scheme from a remote resource responsive to the determining that the device that requested the instance of content cannot execute the executable code.

4. The method as recited in claim 1, wherein each of the plurality of different parsing schemes is specific to the different respective content provider with which it is associated.

5. The method as recited in claim 1, wherein ascertaining the parsing scheme comprises:
determining that the parsing scheme needs to be updated; and
receiving an updated version of the parsing scheme from a remote resource.

6. The method as recited in claim 5, wherein the determining that the parsing scheme needs to be updated is responsive to receiving an indication of one or more changes to the executable code associated with the instance of content.

7. The method as recited in claim 1, wherein the address comprises one or more of a uniform resource locator (URL) or a uniform resource identifier (URI) for the instance of the content.

8. The method as recited in claim 1, wherein parsing the executable code using the parsing scheme to determine the address for the instance of the content comprises parsing at least a portion of a website associated with the content provider of the instance of the content.

9. A computer-implemented method comprising:
maintaining a plurality of different parsing schemes for a plurality of different content providers, the plurality of different parsing schemes each being individually configured to parse different web content that includes executable code associated with a different one of the plurality of different content providers to determine an address for a different instance of content referenced within the different web content and independent of executing the executable code from which the address is determined;
determining that one of the parsing schemes needs to be updated; and
causing the one of the parsing schemes to be updated to produce an updated parsing scheme.

10. The method as recited in claim 9, wherein determining that the one of the parsing schemes needs to be updated is responsive to a request from a remote device for an updated parsing scheme.

11. The method as recited in claim 9, wherein determining that the one of the parsing schemes needs to be updated is responsive to receiving an indication from a remote device of a failure of the one of the parsing schemes.

12. The method as recited in claim 9, wherein determining that the one of the parsing schemes needs to be updated is responsive to an indication from one of the plurality of content providers that the one of the parsing schemes needs to be updated.

13. The method as recited in claim 9, further comprising:
 determining that a remote device previously received the one of the parsing schemes; and
 pushing the updated parsing scheme to the remote device.

14. One or more computer-readable devices storing computer-executable instructions, the instructions comprising:
 a parsing module manager configured to store a plurality of parsing modules, one or more of the parsing modules being specific to a different web content provider than one or more others of the parsing modules and being configured to parse web content received as executable code that is executable to retrieve an instance of content referenced within the web content from the different web content provider, the executable code being parsable to determine an address for retrieving the instance of content independent of executing the executable code from which the address is determined; and
 a parsing module updater configured to cause the one or more of the parsing modules to be updated.

15. The one or more computer-readable devices of claim 14, wherein the executable code associated with the content provider comprises one or more of an executable script, a playlist file, or markup code.

16. The one or more computer-readable devices of claim 14, wherein the parsing module manager is further configured to push the one or more parsing modules to a remote device responsive to an indication of a request from the remote device for the instance of content.

17. The one or more computer-readable devices of claim 14, wherein the parsing module updater is further configured to cause the one or more parsing modules to be updated responsive to an indication of a change in the executable code associated with the different web content provider.

18. The one or more computer-readable devices of claim 17, wherein indication of the change in the executable code comprises an indication of a change to a website associated with the different web content provider.

19. The one or more computer-readable devices of claim 14, wherein the parsing module manager is further configured to maintain a list of devices that have requested at least one of the parsing modules and, responsive to the at least one requested parsing module being updated, push an updated version of the at least one requested parsing module to the devices.

20. The method as recited in claim 1, wherein the instance of content comprises an instance of media content.

* * * * *